United States Patent Office 3,203,995
Patented Aug. 31, 1965

3,203,995
PROCESS FOR REACTING LOWER ALKYL DECA-BORANE WITH ALKYL DI-AMINES AND PRODUCTS THEREOF
Joseph Green, Dover, N.J., and Barney Grofen, West Lafayette, Ind., assignors, by mesne assignments, to Thiokol Chemical Corporation, a corporation of Delaware
No Drawing. Filed Nov. 7, 1957, Ser. No. 695,179
8 Claims. (Cl. 260—583)

This invention relates to solid reaction products of certain amines and lower alkyl decaboranes.

The solid products of this invention when incorporated with suitable oxidizers, such as ammonium perchlorate, potassium perchlorate, sodium perchlorate, ammonium nitrate and etc., yield solid propellants suitable for rocket power plants and other jet propelled devices. Such propellants burn with high flame speeds, have high heats of combustion and are of the high specific impulse type. Probably the single most important factor is determining the performance of a propellant charge is the specific impulses, and appreciable increases in performance will result from the use of the higher specific impulse materials. The products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as the pyrotechnic type igniter, and are mechanically strong enough to withstand ordinary handling.

The solid reaction products of this invention are prepared by reacting a lower alkyl decaborane with a primary or secondary aliphatic di-amine containing from one to eight carbon atoms.

Suitable alkyl decaboranes include lower alkyl decaboranes in which the alkyl group contains 1 to 5 carbon atoms. Lower alkyl decaboranes can be prepared, for example, according to the method described in application Serial No. 540,141, filed October 12, 1955, now U.S. Patent No. 3,109,303, to Altwicker et al.

Suitable di-amines include, for example, ethylenediamine, propylenediamine, trimethylenediamine, 1,3-diaminobutane, putrescine, cadaverine, hexamethylenediamine, and octamethylenediamine.

The ratio of reactants can be varied widely, generally being in the range of 0.05 to 20 moles of alkyl decaborane per mole of amine, preferably 0.1 to 3.1. The reaction temperature can vary from 80° C. to 150° C. and the pressure can vary from subatmospheric to several atmospheres, i.e. from 0.2 to 5.0 atmospheres. The reaction to go to completion generally requires from one to fifty hours depending upon the ratio of reactants, the particular reactants utilized, and the temperature and pressure employed.

Although the reaction will proceed in the absence of a solvent, best results are obtained by carrying out the reaction in a solvent common for the reactants but inert with respect to the reactants. Such solvents include aliphatic hydrocarbon solvents such as n-pentane, hexane, n-hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but generally ranges up to about 70 times the weight of the reactants. When a solvent is employed, it is preferred to carry out the reaction at the reflux temperature of the solvent.

The process of the invention is illustrated in detail by the following examples which are to be considered not limitative.

Example I

A 500 ml. glass flask was equipped with a magnetic stirrer, thermometer and dropping funnel with a bypass. To the flask was also connected a reflux condenser with a drying tube leading to a wet test meter and to a gas collecting system. To this flask containing 100 ml. of benzene at room temperature 7.5 grams (0.05 mole) of ethyldecaborane and 3.0 grams (0.05 mole) of ethylenediamine were added simultaneously over a period of 1.5 hours. The reaction mixture was maintained at benzene reflux temperature (80° C.) for 24 hours, during which time it was observed that a gas later analyzed as hydrogen evolved. The benzene was then separated from the white solid which formed in the flask by evaporation at a vacuum of $10^{-2}$ millimeters of mercury. 6.4 grams of white solid were found and analyzed by both infrared and wet chemical analysis. The infrared spectrum indicated a 2 amine:1 boron hydride covalently linked compound having the formula $C_6H_{30}N_4B_{10}$. Wet chemical analysis indicated the following percentages: C=26.90, H=10.76. N=23.23, B=43.25 as contrasted with the calculated values for the above formula of C=27.07, H=11.28, N=21.05 and B=40.60.

Example II

A 500 ml. glass flask was equipped with a magnetic stirrer, thermometer and dropping funnel with a bypass. To the flask was also connected a reflux condenser with a drying tube leading to a wet test meter and to a gas collecting system. A solution containing 5.8 grams (0.05 mole) of isopropylaminopropyl amine

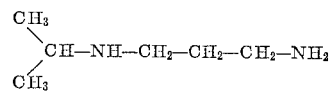

and 7.5 grams (0.05 mole) of ethyldecaborane in 30 ml. of cyclohexane was placed in the flask and maintained at reflux temperature (80° C.) for three hours. During the reaction, a 0.061 mole of a gas later analyzed as hydrogen was evolved. The solution was cooled and the cyclohexane evaporated under a vacuum of $10^{-2}$ millimeters of mercury leaving a white talc like powder. An infrared spectrum showed strong BO absorption maxima.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 10 to 35 parts by weight of boron containing material and from 65 to 90 by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin or polymer such as the polyurethan type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of a resin such as that mentioned previously or a pre-polymer of the resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

We claim:

1. A process for the preparation of solid reaction products of amines and alkyl decaboranes which comprises reacting from 0.05 to 20 moles of a lower alkyl decaborane with an amine selected from the group consisting of primary and secondary alkyl di-amines containing from 1 to 8 carbon atoms at a temperature of about 80° C. to 150° C. for from one to fifty hours with the elimination of hydrogen.

2. A process for the preparation of solid reaction products of amines and alkyl decaboranes which comprises reacting from 0.1 to 3.1 moles of an alkyl decaborane in which the alkyl group contains from one to five carbon atoms per mole of an amine selected from the group consisting of primary and secondary alkyl di-amines containing from one to eight carbon atoms in the presence of a solvent inert with respect to the reactants at a temperature of 80° C. to 150° C. for from three to fifty hours with elimination of hydrogen.

3. A process for the preparation of solid reaction products of amines and ethyldecaborane which comprises reacting from 0.1 to 3 moles of ethyldecaborane per mole of an amine selected from the group consisting of primary and secondary alkyl di-amines containing from one to eight carbon atoms for from three to 24 hours in the presence of a solvent selected from the group consisting of benzene, cyclohexane and n-hexane at a temperature of about 80° to 85° C. with the elimination of hydrogen.

4. The process of claim 3 in which the amine is ethylenediamine and the solvent is benzene.

5. The process of claim 3 in which the amine is isopropylaminopropylamine of the formula

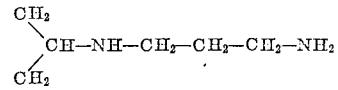

and the solvent is cyclohexane.

6. The product produced by the process of claim 1.
7. The product produced by the process of claim 4.
8. The product produced by the process of claim 5.

References Cited by the Examiner

Schechter et al.: Boron Hydride and Related Compounds, January 8, 1951, Callery Chemical Co., pp. 36–37.

CHARLES B. PARKER, *Primary Examiner.*

LEON D. ROSDOL, *Examiner.*